United States Patent
Myles

(10) Patent No.: US 12,510,109 B2
(45) Date of Patent: Dec. 30, 2025

(54) OIL LEAK MITIGATION FOR HYDRAULIC SYSTEMS

(71) Applicant: J. E. Myles, Inc. Control Power Division, Troy, MI (US)

(72) Inventor: Scott Myles, Troy, MI (US)

(73) Assignee: J. E. Myles, Inc. Control Power Division, Troy, MI (US)

( * ) Notice: Subject to any disclaimer, the term of this patent is extended or adjusted under 35 U.S.C. 154(b) by 0 days.

(21) Appl. No.: 18/142,614

(22) Filed: May 3, 2023

(65) Prior Publication Data

US 2023/0358256 A1    Nov. 9, 2023

Related U.S. Application Data

(60) Provisional application No. 63/337,636, filed on May 3, 2022.

(51) Int. Cl.
  *F15B 15/14* (2006.01)
  *F15B 20/00* (2006.01)

(52) U.S. Cl.
  CPC ........ *F15B 15/1452* (2013.01); *F15B 20/005* (2013.01)

(58) Field of Classification Search
  CPC . F15B 15/1452; F15B 20/005; F15B 15/1433
  See application file for complete search history.

(56) References Cited

U.S. PATENT DOCUMENTS 3,443,486 A * 5/1969 Lanman ............... F16J 15/3204
                                                    92/252
6,374,723 B1 * 4/2002 Cook .................... F15B 20/005
                                                    92/86

* cited by examiner

*Primary Examiner* — Nathaniel E Wiehe
*Assistant Examiner* — Daniel S Collins
(74) *Attorney, Agent, or Firm* — The Dobrusin Law Firm, P.C.

(57) ABSTRACT

A system for oil leak mitigation in hydraulic systems. The systems and methods prevent or mitigate oil leakage from hydraulic components. In one embodiment, a flexible bellows is provided positioned over a hydraulic rod to collect leaking oil. The bellows is connected to the hydraulic actuator by means of at least one magnet, in one embodiment. In another embodiment, a sleeve is connected to the actuator to collect oil droplets. The sleeve is connected to the actuator by means of a 4-bolt flange (in some embodiments).

5 Claims, 9 Drawing Sheets

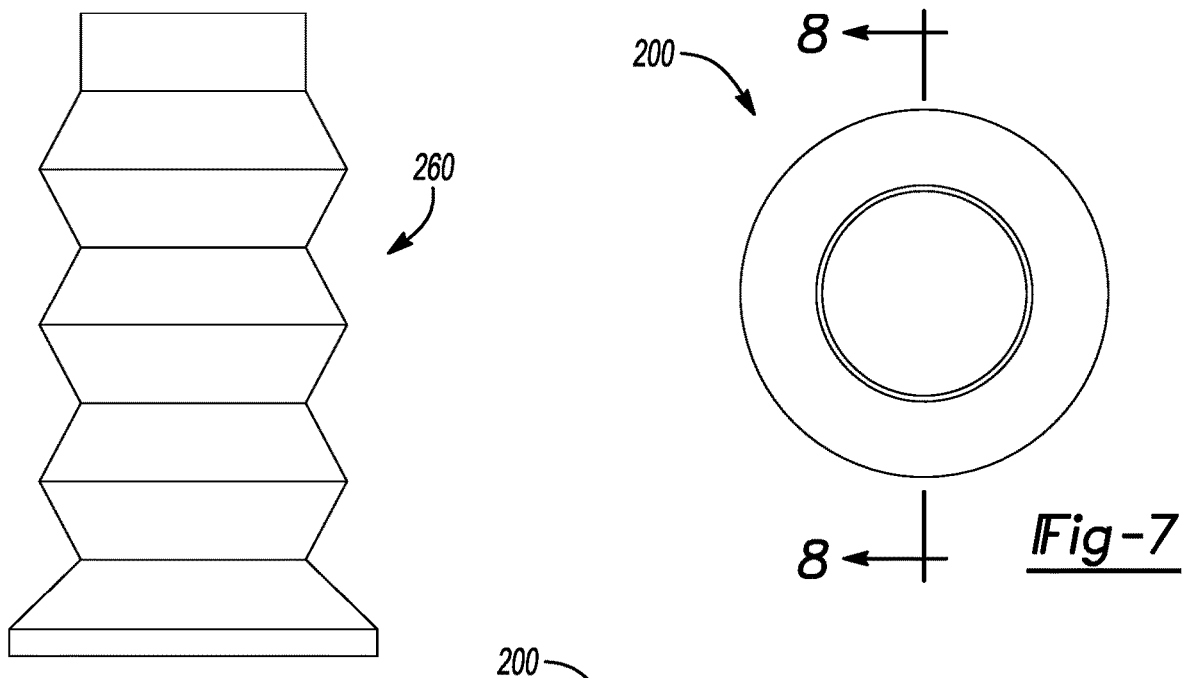
Fig-5
Fig-7
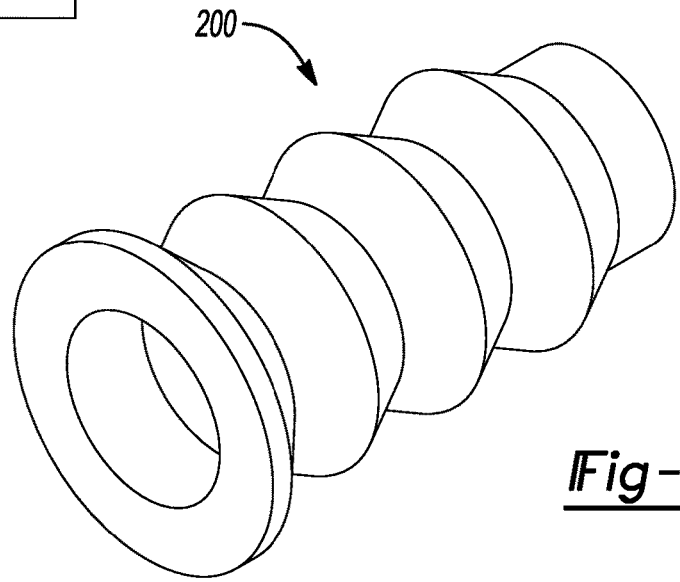
Fig-6
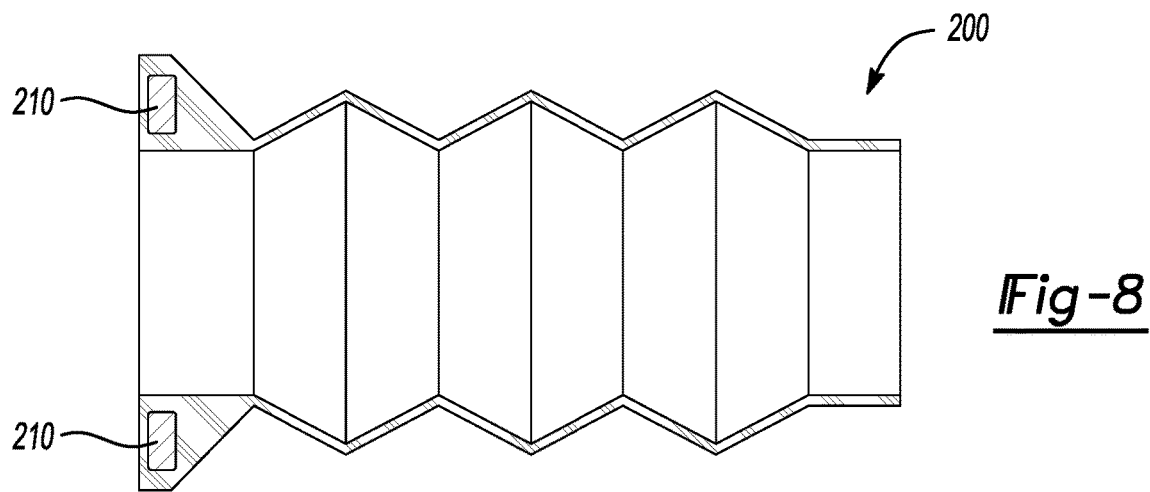
Fig-8

OIL LEAK MITIGATION FOR HYDRAULIC SYSTEMS

CROSS REFERENCE TO RELATED APPLICATIONS

This application claims priority and benefit to Provisional Patent Application Ser. No. 63/337,636 filed May 3, 2022.

TECHNICAL FIELD

The present specification generally relates to oil leak mitigation and, more specifically, an oil leak mitigation system and apparatus in hydraulic applications.

BACKGROUND

Oil leaks in hydraulic systems are common and can be burdensome and costly. Not only is loss of oil an issue, preventing oil from dripping on equipment positioned below hydraulic actuators is particularly desirable for both cleanliness and safety reasons. Accordingly, oil leak mitigation systems are needed in the industry.

Oil leaks in manufacturing plants can pose a variety of dangers, both to workers and the environment. Some of the main dangers of oil leaks in manufacturing plants include:

Fire and Explosion Risk: Oil leaks can create a fire hazard, as oil can easily ignite and spread flames. This is particularly dangerous in manufacturing plants that use heat, sparks, or flames as part of their manufacturing processes.

Slip and Fall Hazards: Oil leaks can create slippery surfaces, which can increase the risk of slip and fall accidents. These accidents can result in serious injuries such as broken bones, head injuries, and back injuries.

Machinery Damage: Oil leaks can damage machinery and equipment, causing them to malfunction or break down. This can result in costly repairs and production downtime.

Environmental Damage: Oil leaks can contaminate the environment, including soil, water, and air. This can harm wildlife and plant life, as well as disrupt local ecosystems.

Health Risks: Exposure to oil and other chemicals found in manufacturing plants can lead to a range of health problems, including skin irritation, respiratory problems, and even cancer.

To mitigate the dangers of oil leaks in manufacturing plants, it is important for companies to implement proper maintenance and safety protocols, including regular equipment inspections and repairs, training programs for workers on how to identify and respond to oil leaks, and environmental monitoring programs to ensure that any spills or leaks are contained and cleaned up promptly. However, in certain hydraulic systems, oil leak mitigation efforts are not sufficient.

Accordingly, there exists a need in the art to provide an improved system overcoming the aforementioned disadvantages.

SUMMARY

Disclosed are systems and methods for oil leak mitigation in hydraulic systems. The systems and methods prevent or mitigate oil leakage from hydraulic components. In one embodiment, a flexible bellows is provided positioned over a hydraulic rod to collect leaking oil. The bellows is connected to the hydraulic actuator by means of at least one magnet, in one embodiment. In a second embodiment, a sleeve (or hose, the terms are user interchangeable herein) is connected to the actuator to collect oil droplets. The sleeve is connected to the actuator by means of a 4-bolt flange (in some embodiments).

An oil leak mitigation system for a hydraulic actuator is provided, the hydraulic actuator having a movable rod, the rod having a distal end extending away from the hydraulic actuator, the system having a flexible bellows, the bellows positioned around the movable rod of the hydraulic actuator, the movable bellows attached to the distal end of the rod at one end and to the hydraulic actuator at the other end, wherein as the rod moves, the bellows expands and contracts, and wherein as the seal of the hydraulic actuator drips oil, the bellows collects said oil to prevent leakage below.

An oil leak mitigation system for a hydraulic actuator, the hydraulic actuator having a threaded end cap where oil can escape, the system having a sleeve having a lip and an interior capacity, the sleeve connected over the threaded end cap of the hydraulic actuator by means of a flange and wherein as the seal of the hydraulic actuator drips oil, the sleeve collects said oil to prevent leakage below.

The present invention relates to a system for oil leak mitigation in hydraulic systems. The system and methods described herein are designed to prevent or mitigate oil leakage from hydraulic components, such as hydraulic actuators.

In one embodiment, the system includes a flexible bellows that is positioned over a hydraulic rod. The bellows is made of a material that is resistant to hydraulic fluid, and is designed to expand and contract as the rod moves. The bellows is connected to the hydraulic actuator by means of at least one magnet, which provides a secure connection while also allowing for easy installation and removal.

In another embodiment, the system includes a sleeve that is connected to the hydraulic actuator to collect oil droplets that may leak from the actuator. The sleeve is designed to fit over the threaded end cap of the hydraulic actuator, and is connected to the actuator by means of a 4-bolt flange in some embodiments. The sleeve is also designed to be easily removable for maintenance and repair purposes.

In one embodiment, an oil leak mitigation system for a hydraulic actuator, the hydraulic actuator having a movable rod, the rod having a distal end extending away from the hydraulic actuator, the system including a flexible bellows, the bellows positioned around the movable rod of the hydraulic actuator, the movable bellows attached to the distal end of the rod at one end and to the hydraulic actuator at the other end, wherein as the rod moves, the bellows expands and contracts, and wherein as the seal of the hydraulic actuator drips oil, the bellows collects said oil to prevent leakage below. In some embodiments, the flexible bellows connects to the hydraulic actuator by means of a magnet embedded within the flexible bellows. In other embodiments, the flexible bellows is positioned around the movable rod of the hydraulic actuator in a way that allows the bellows to maintain a seal between the movable rod and the hydraulic actuator. In some embodiments, the flexible bellows is made of a material that is capable of withstanding a range of temperatures and pressures that are present in the hydraulic actuator during operation. In other embodiments, a pressure relief valve may be positioned at a top end of the flexible bellows to prevent overpressure buildup within the bellows.

In another embodiment, an oil leak mitigation system for a hydraulic actuator, the hydraulic actuator having a threaded end cap where oil can escape, the system having a sleeve having a lip and an interior capacity, the sleeve connected over the threaded end cap of the hydraulic actuator by means of a flange, wherein as the seal of the hydraulic actuator drips oil, the sleeve collects said oil to prevent leakage below. In some embodiments, the sleeve is made of a material that is resistant to hydraulic fluid, to prevent degradation or damage to the sleeve. In other embodiments, the sleeve is designed to be easily removable from the hydraulic actuator for maintenance and repair purposes. In some embodiments, a drainage outlet at the bottom of the sleeve to allow collected oil to be drained out of the system. In some embodiments, the sleeve is designed to be adjustable in length to accommodate different sizes of hydraulic actuators. In other embodiments, a seal or gasket positioned between the flange and the end cap of the hydraulic actuator to prevent oil from escaping around the connection.

In yet another embodiments, a hydraulic actuator oil leak mitigation system is provided having a flexible bellows positioned around a movable rod of the hydraulic actuator, the movable rod having a distal end extending away from the hydraulic actuator, the flexible bellows attached at one end to the distal end of the movable rod and at the other end to the hydraulic actuator, wherein the flexible bellows expands and contracts as the movable rod moves, and wherein the flexible bellows collects oil from a seal of the hydraulic actuator that drips oil during operation thereby preventing oil leakage below the hydraulic actuator. In some embodiments, a drainage outlet at the bottom of the flexible bellows is provided to allow collected oil to be drained out of the system. In other embodiments, the flexible bellows is made of a material that is resistant to hydraulic fluid, to prevent degradation or damage to the bellows. In other embodiments, the flexible bellows is positioned around the movable rod of the hydraulic actuator in a way that allows the bellows to maintain a seal between the movable rod and the hydraulic actuator. In some embodiments, the flexible bellows is made of a material that is capable of withstanding a range of temperatures and pressures that are present in the hydraulic actuator during operation. In other embodiments, a pressure relief valve positioned at a top end of the flexible bellows to prevent overpressure buildup within the bellows. In some embodiments, the flexible bellows is designed to allow for easy installation and removal from the hydraulic actuator, for maintenance and repair purposes. In some embodiments, the flexible bellows is designed to be adjustable in length, to accommodate different sizes of hydraulic actuators and movable rods. In other embodiments, the flexible bellows connects to the hydraulic actuator by means of a magnet embedded within the flexible bellows.

The system and methods described herein provide an effective solution for oil leak mitigation in hydraulic systems. By collecting leaking oil, the system helps prevent oil from escaping into the environment, reducing the risk of contamination and damage to machinery. Additionally, the system is designed to be easy to install and maintain, minimizing downtime and reducing overall costs.

BRIEF DESCRIPTION OF THE DRAWINGS

The embodiments set forth in the drawings are illustrative and exemplary in nature and not intended to limit the subject matter. The following detailed description of the illustrative embodiments can be understood when read in conjunction with the following drawings, where like structure is indicated with like reference numerals and in which:

FIG. 5 depicts a side view of the bellows retracted according to one or more embodiments shown and described herein;

FIG. 6 depicts a perspective view of the bellows retracted according to one or more embodiments shown and described herein;

FIG. 7 depicts an end view of the bellows retracted according to one or more embodiments shown and described herein;

FIG. 8 depicts a side and partial cross-sectional view (illustrating the magnet(s)) of the bellows retracted according to one or more embodiments shown and described herein;

DETAILED DESCRIPTION

Figure 1:
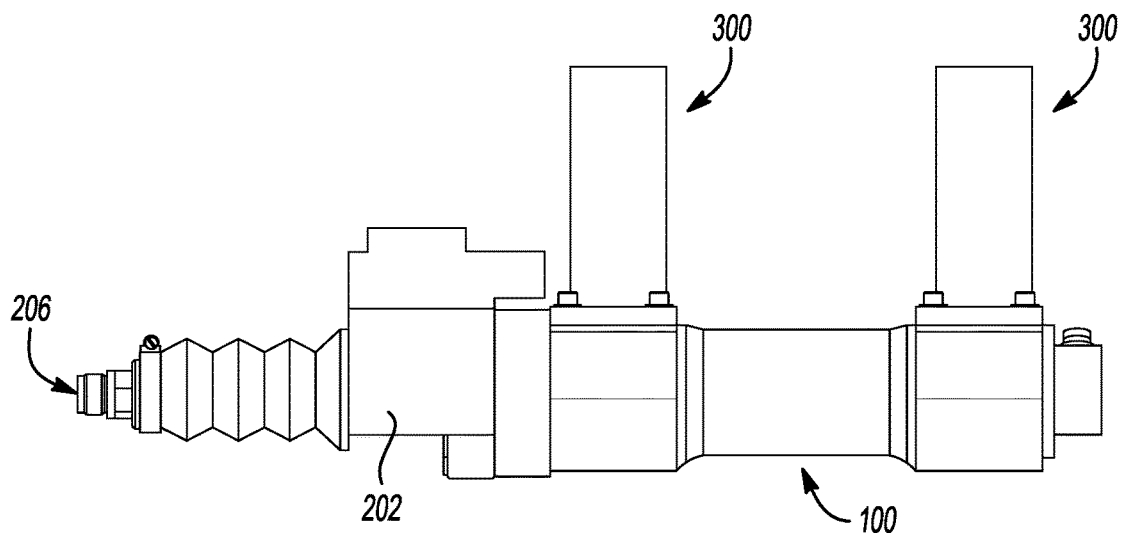
FIG. 1 depicts a side view of the leak mitigation system with the bellows expanded according to one or more embodiments shown and described herein.

Disclosed are systems and methods for oil leak mitigation in hydraulic systems. The systems and methods prevent or mitigate oil leakage from hydraulic components. In one embodiment, a flexible bellows is provided positioned over a hydraulic rod to collect leaking oil. The bellows is connected to the hydraulic actuator by means of at least one magnet, in one embodiment. In a second embodiment, a sleeve (or hose, the terms are user interchangeable herein) is connected to the actuator to collect oil droplets. The sleeve is connected to the actuator by means of a 4-bolt flange (in some embodiments).

FIGS. 1-4 depict a hydraulic actuator 100 having a bellows 200 connected thereto. The bellows 200 is made of a flexible material such as a silicone, a plastic, a polymer, silicone-like, polymer-like, plastic-like, or any other material having similar properties suitable for high repetition and high temperature resiliency. The bellows 200 connects to an actuator 202 by means of a magnet 210 or other securing means such as an adhesive, mechanical connection, or a combination of any connecting means. The magnet 210 may be a plurality of magnets or a circular/ring configuration. The magnet 210 is embedded into the bellows 200. In this case, the magnet 210 is formed directly into the bellows 200 during production. The bellows 200 connects to the actuator 202 at the actuator end 202, which is metallic in some embodiments to allow the magnet 210 embedded into the bellows 200 to attach thereto. The magnet may be a plurality of magnets are a single magnet in the shape of a ring or other suitable shape.

Figure 2:
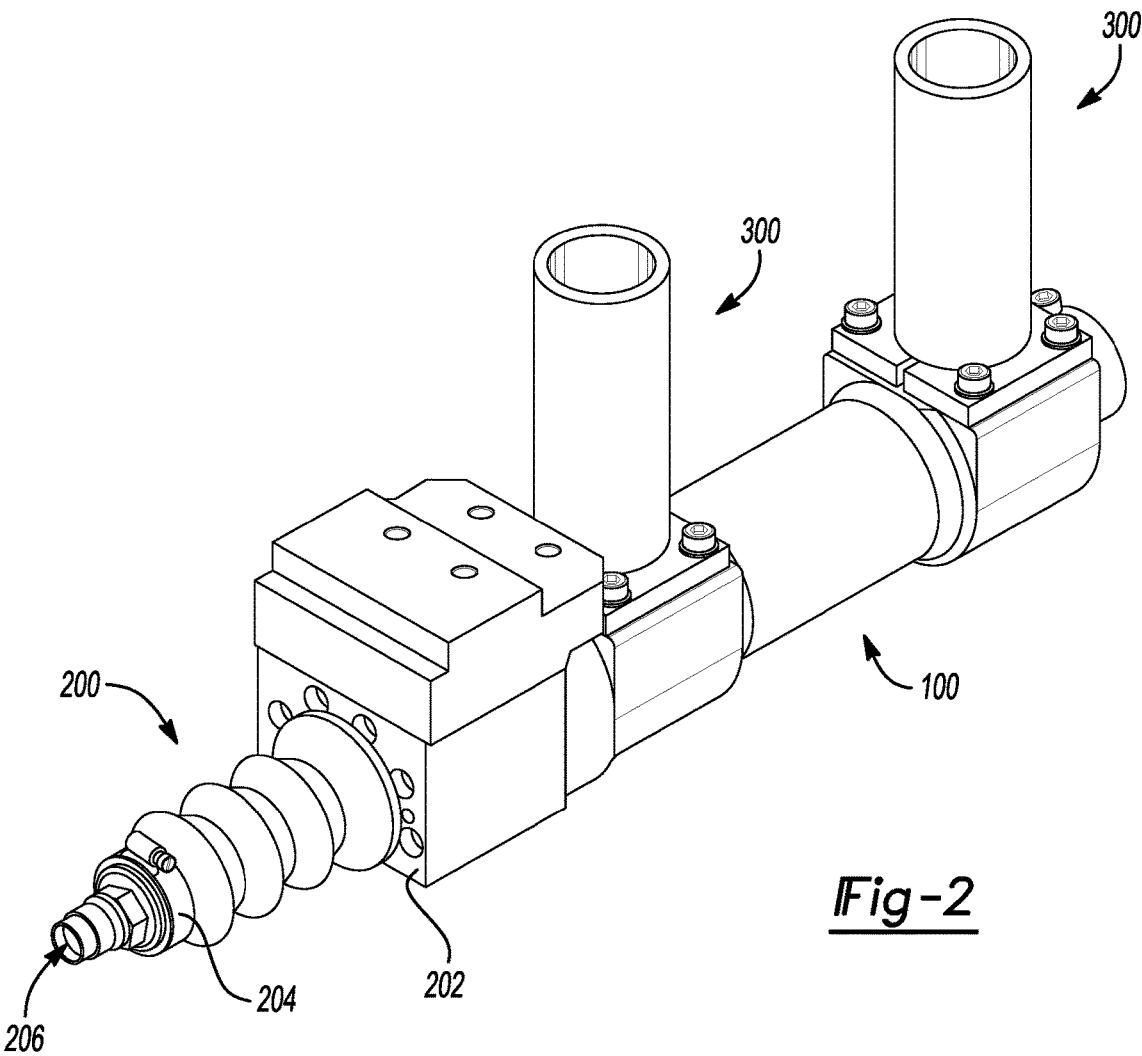
FIG. 2 depicts a perspective view of the leak mitigation system with the bellows expanded according to one or more embodiments shown and described herein.
Figure 3:
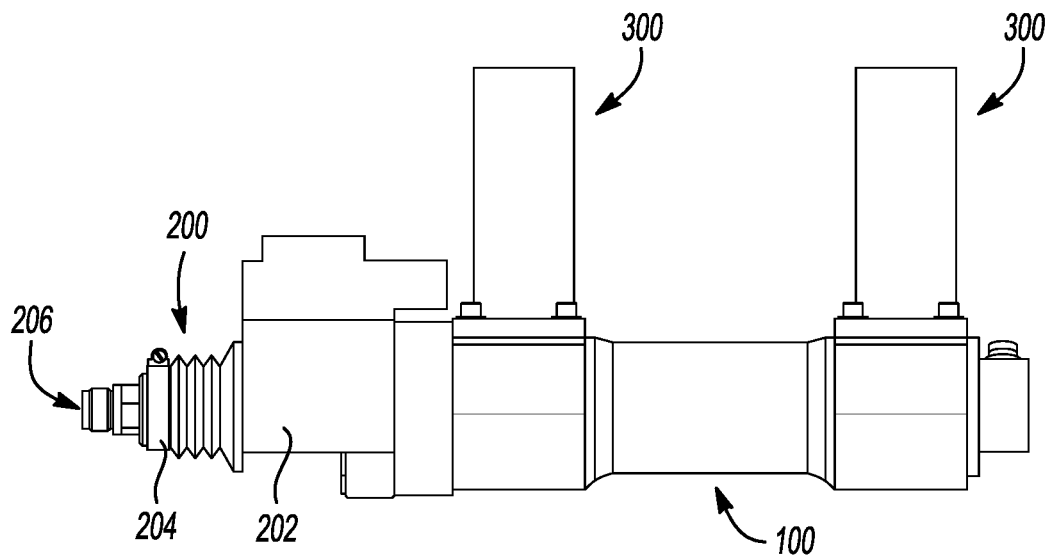
FIG. 3 depicts a side view of the leak mitigation system with the bellows retracted according to one or more embodiments shown and described herein.
Figure 4:
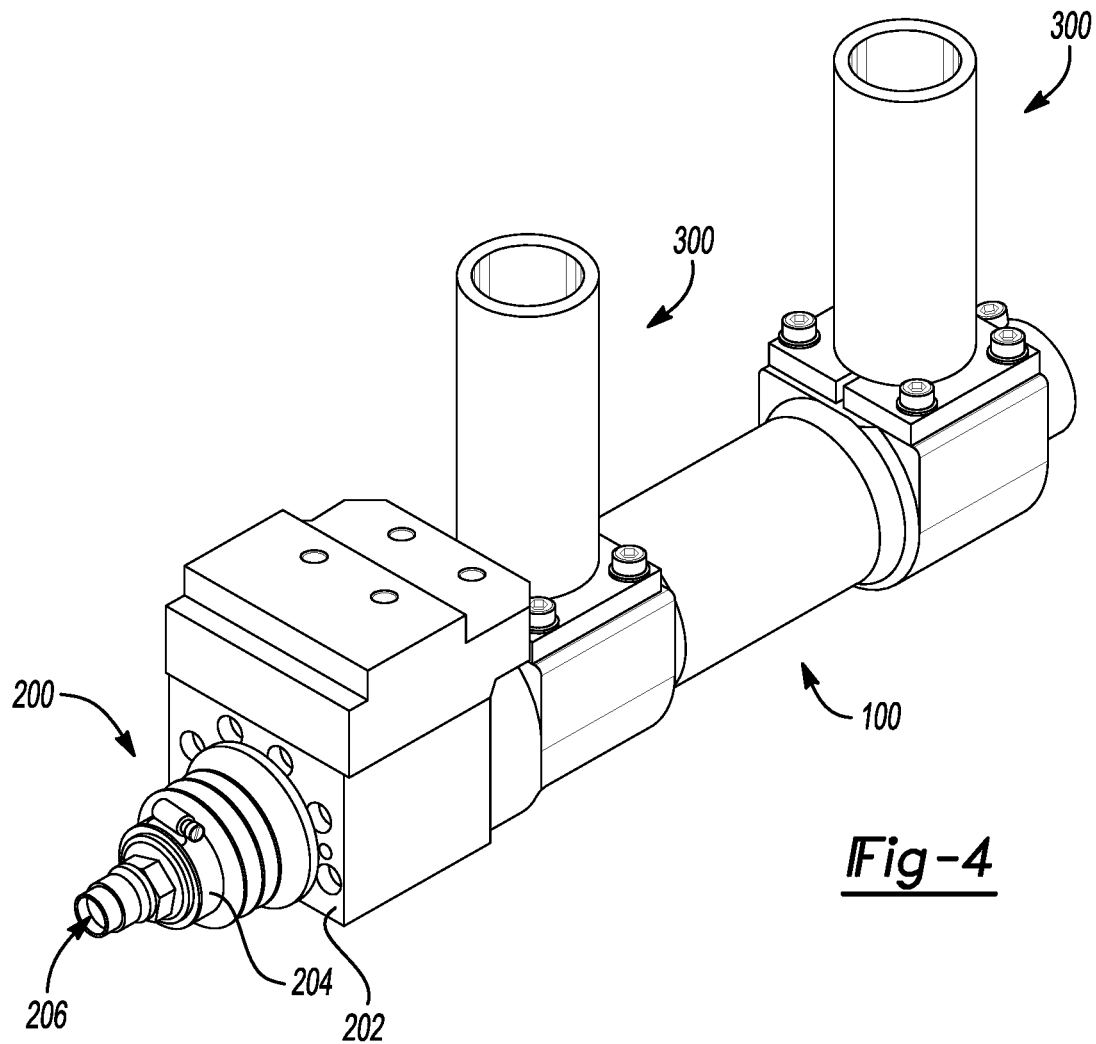
FIG. 4 depicts a perspective view of the leak mitigation system with the bellows retracted according to one or more embodiments shown and described herein.

The bellows 200 is flexible allowing it to extend and retract. FIGS. 1 and 2 depict the bellows 200 in an extended position. FIGS. 3 and 4 depict the bellows 200 in a retract position. The bellows 200 is configured to extend and retract with the movement of a hydraulic rod 206. The bellows 200 connects to the rod 206 be means of a rod connector 204. In the embodiment shown herein, the rod connector 204 is a worm gear clamp and is removable from the rod 206 to remove collected oil. As the rod 206 moves in and out of the hydraulic actuator 202, the bellows 200 moves with the rod 206 and extends and retracts respectively.

FIGS. 5 and 6 depicts a side view of the bellows 200 retracted according to one or more embodiments shown and described herein. FIG. 7 depicts an end view of the bellows retracted according to one or more embodiments shown and described herein, where the cross section is shown in FIG. 8. The magnet(s) 210 are embedded within the bellows 200.

Figure 9:
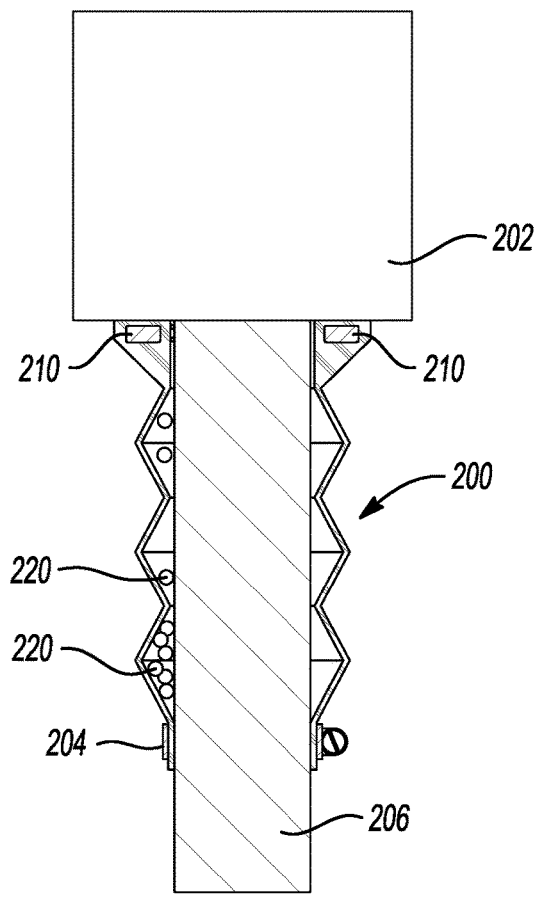
FIG. 9 depicts a side schematic view of the bellows extended according to one or more embodiments shown and described herein.
Figure 10:
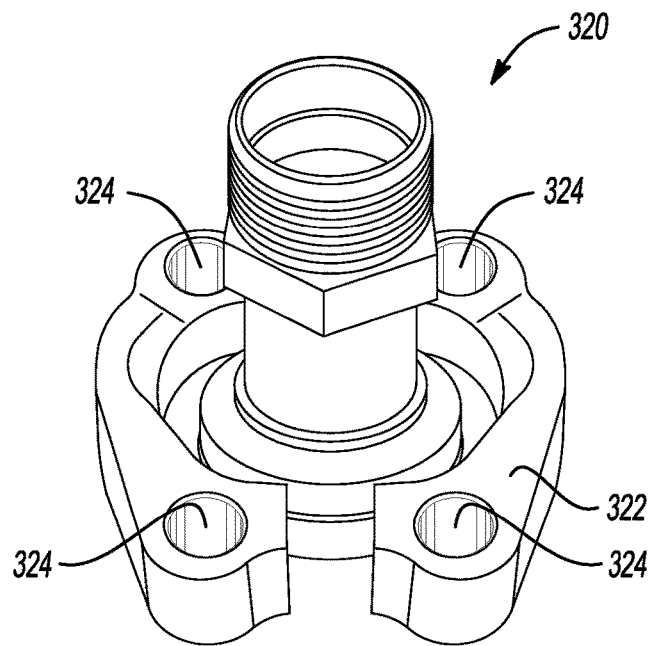
FIG. 10 depicts a 4-bolt flange of the prior art.
Figure 11:
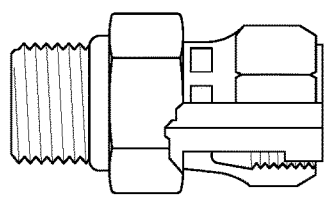
FIG. 11 depicts threaded connections of the prior art.
Figure 11:
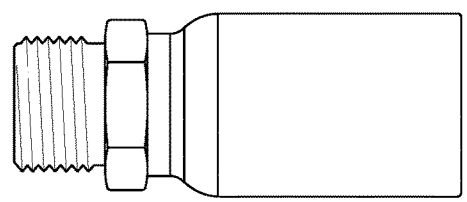
Figure 11:
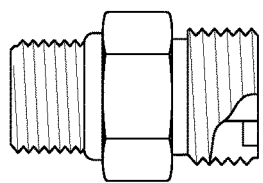
Figure 11:
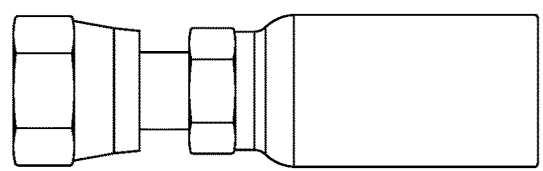

FIG. 9 depicts a side schematic view of the bellows extended according to one or more embodiments shown and described herein. In this view, oil 220 drips from the main seal of the rod 206 to the actuator 202. The bellows is configured to capture the oil 220 so that it does not drop on equipment, product, people, the floor . . . etc. for cleanliness and safety purposes. In some embodiments, the bellows is clear, transparent, translucent, partially clear, partially translucent, or partially transparent so that the user can view the oil contained within bellows 200 and to know when to drain or empty the bellows 200. When its time to empty the bellows 200, the user removes the rod connector 204 from the rod 206 and removes the magnetic bellows 200 from the end actuator 202. The user then has the opportunity to identify the leak location, repair the leak on the actuator, and/or otherwise maintain the actuator. The bellows 200 can then be cleaned and re-installed (or replaced).

FIGS. 12-21 depict various views of a sleeve 300 connected to the actuator 100 according to one or more embodiments shown and described herein. The sleeve 300 is made of a flexible material such as a silicone, a plastic, a polymer, silicone-like, polymer-like, plastic-like, or any other material having similar properties suitable for high repetition and high temperature resiliency. The sleeve 300 is intended for use as a backup lead mitigation as its used over an already high-pressure seal. The sleeve 300 is intended to catch oil 370 leaks that get past the high-pressure seal already provided in the actuator 100.

The sleeve 300 includes a sleeve lip 301 and a sleeve interior 303. The sleeve lip 301 is configured to connect with the bolt flange 320 having a flange base 322. Bold apertures 324 extend through the flange base 322 to connect with the actuator 100 to secure the sleeve 300 to the actuator 100 (at the sleeve lip).

Figure 12:
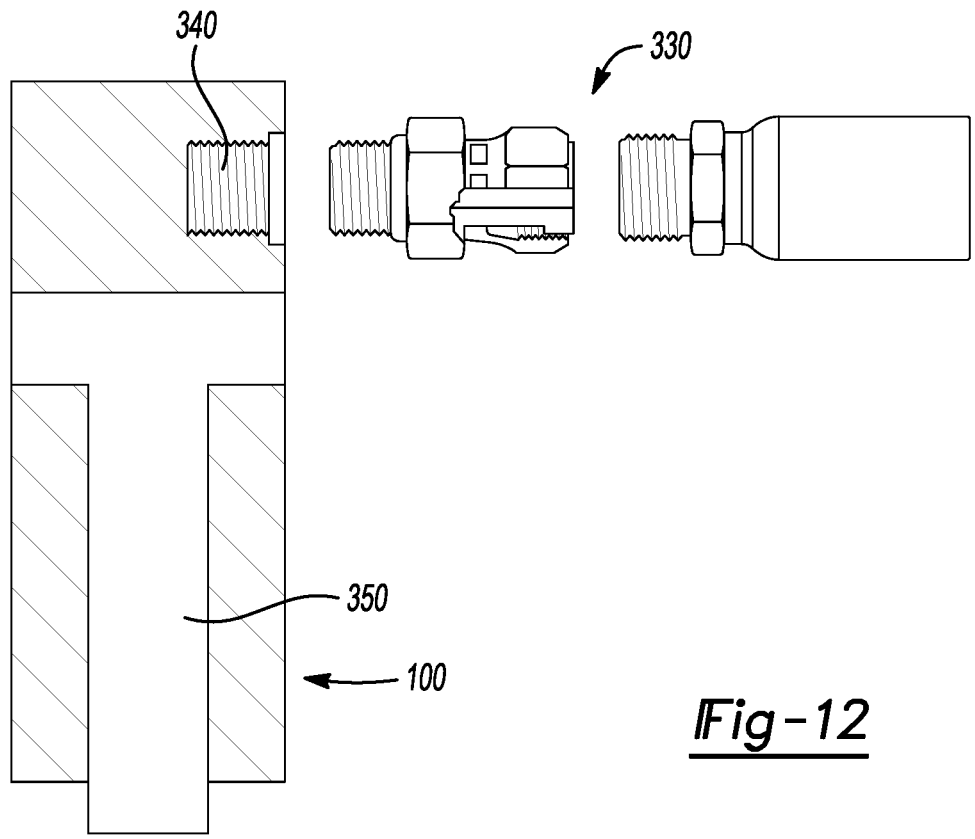
FIG. 12 depicts a side schematic view of the of a threaded connection connecting to a hydraulic actuator with threaded connections according to one or more embodiments shown and described herein.

FIG. 12 depicts a side schematic (exploded) view of the of a threaded connection of a cylinder end cap 340 connecting to a hydraulic actuator 100 with threaded connections 330. The hydraulic actuator 100 includes a hydraulic 350. FIG. 12 depicts the actuator 100 prior to installation of the sleeve 300.

Figure 13:
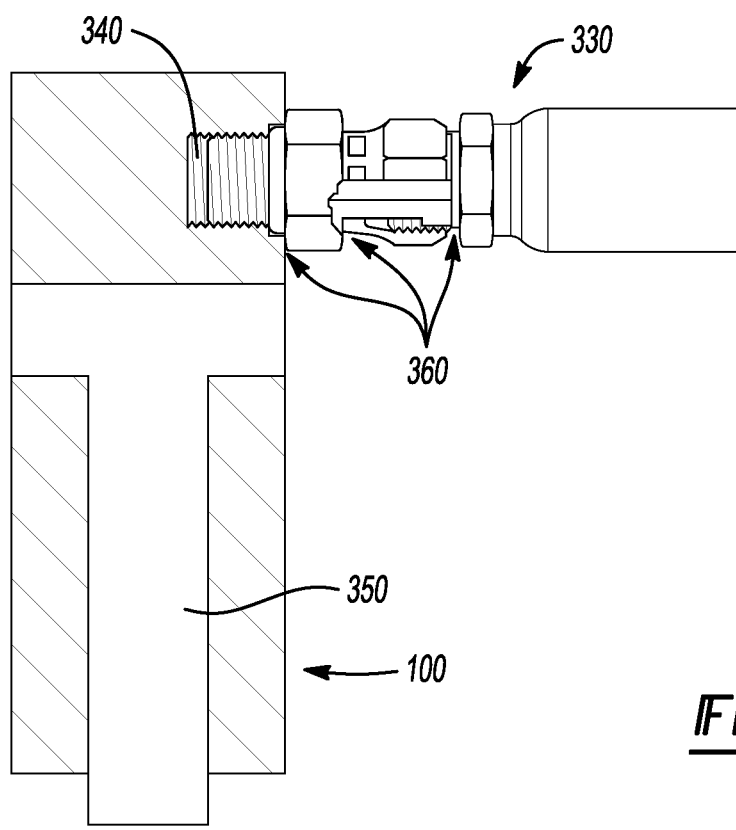
FIG. 13 depicts a side schematic view of the of a threaded connection connecting to a hydraulic actuator with threaded connections and potential leak points according to one or more embodiments shown and described herein.

FIG. 13 depicts similarly a side schematic view of a threaded connection of a cylinder end cap 340 connecting to a hydraulic actuator 100 with threaded connections 330. The hydraulic actuator 100 includes a hydraulic 350. FIG. 13 depicts the actuator 100 prior to installation of the sleeve 300.

Figure 14:
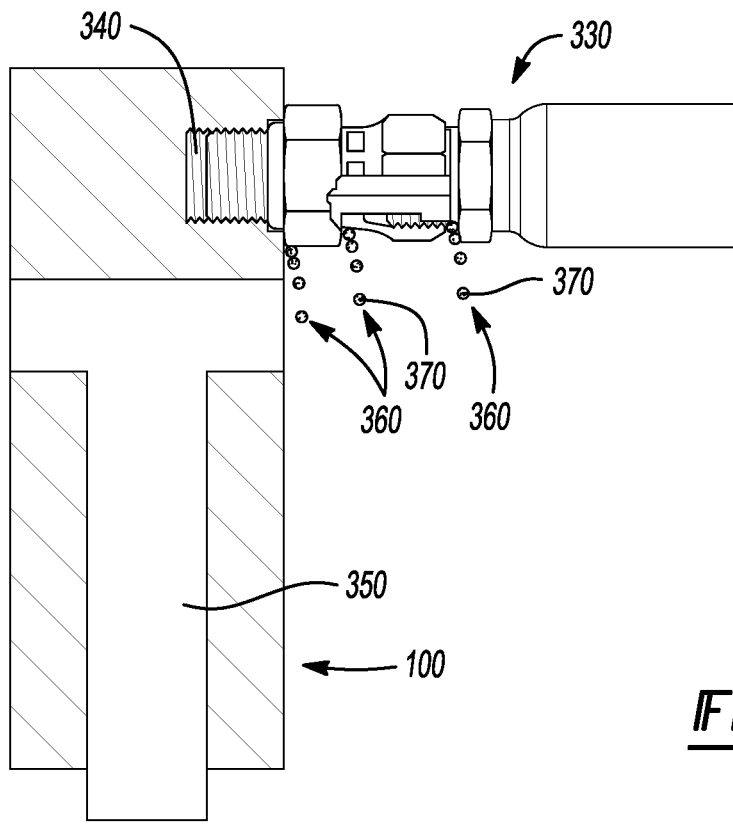
FIG. 14 depicts a side schematic view of the of a threaded connection connecting to a hydraulic actuator with threaded connections and leak points leaking oil at high-pressure seals according to one or more embodiments shown and described herein.

FIG. 14 depicts another a side schematic view of a threaded connection of a cylinder end cap 340 connecting to a hydraulic actuator 100 with threaded connections 330 with oil leaks 370 at the leak points 360. The hydraulic actuator 100 includes a hydraulic 350. FIG. 14 depicts the actuator 100 prior to installation of the sleeve 300.

Figure 15:
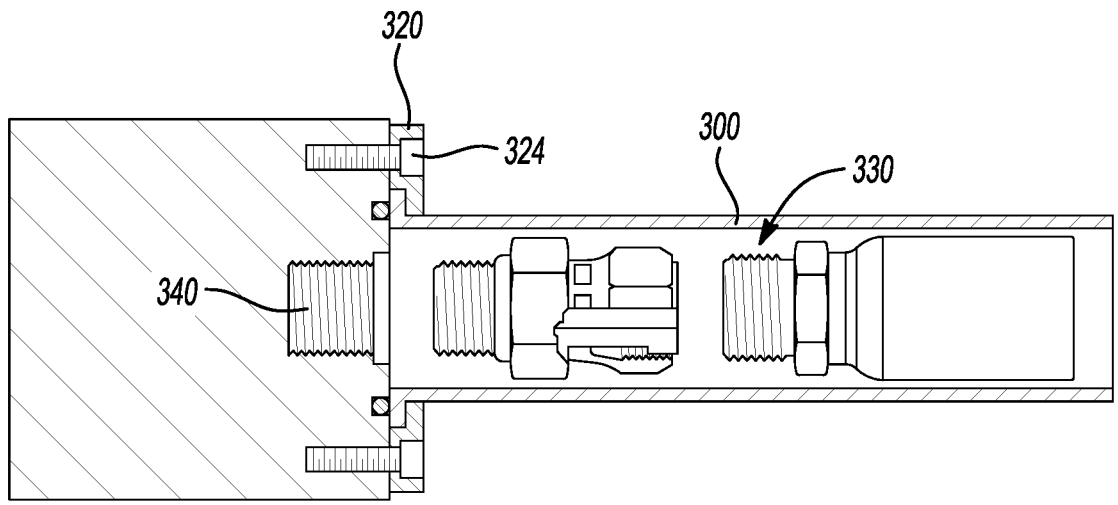
FIG. 15 depicts a side schematic view of the of a threaded connection connecting to a hydraulic actuator with threaded connections according to one or more embodiments shown and described herein.

FIG. 15 depicts another side schematic view of a threaded connection of a cylinder end cap 340 connecting to a hydraulic actuator 100 with threaded connections 330 using a bolt flange 320 and bolt apertures/bolts 324. The hydraulic actuator 100 includes a hydraulic 350.

Figure 16:
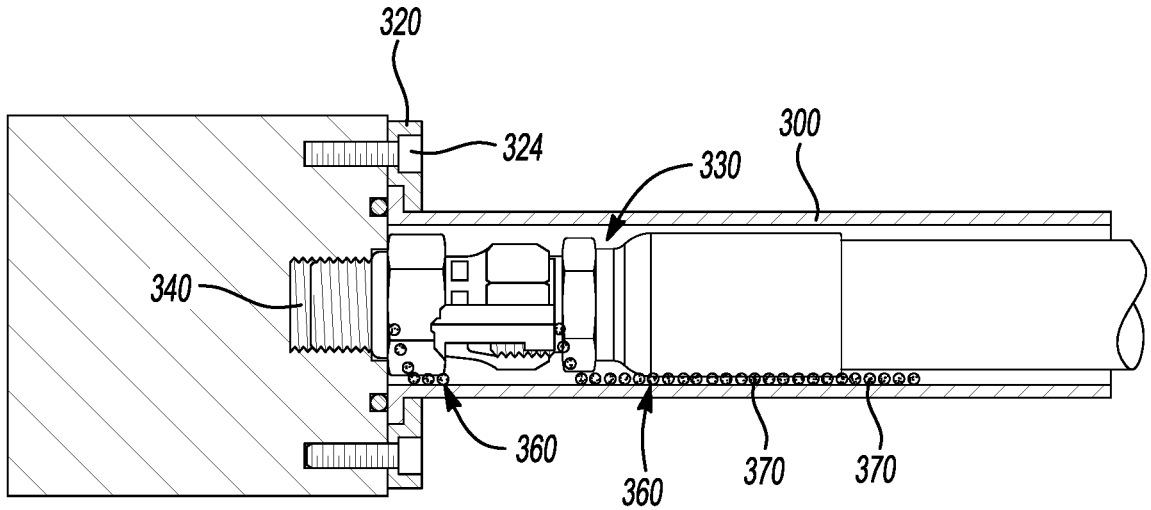
FIG. 16 depicts a side schematic view of the of a threaded connection connecting to a hydraulic actuator with threaded connections and leak points leaking oil at high-pressure seals with a sleeve according to one or more embodiments shown and described herein.
Figure 17:
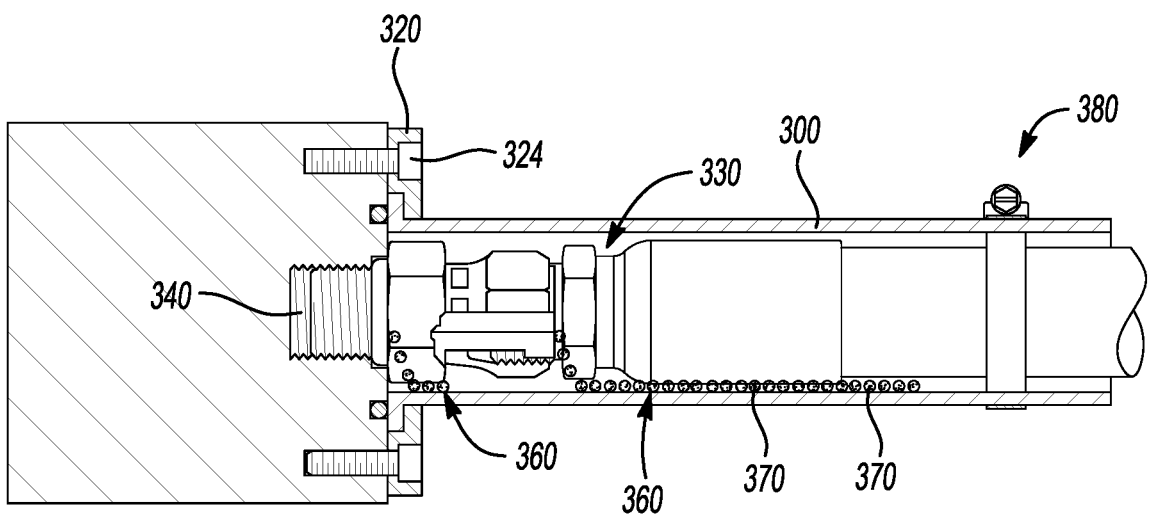
FIG. 17 depicts a side schematic view of the of a threaded connection connecting to a hydraulic actuator with threaded connections and leak points leaking oil at high-pressure seals with a sleeve according to one or more embodiments shown and described herein.
Figure 18:
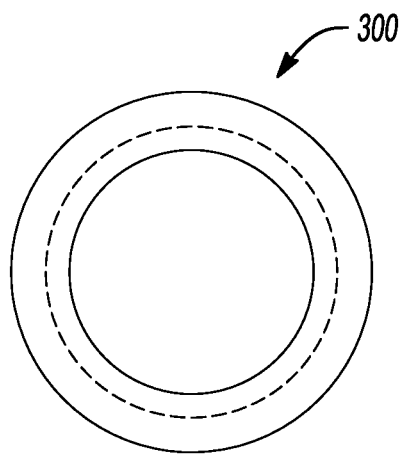
FIG. 18 depicts an end view of the sleeve/hose according to one or more embodiments shown and described herein.
Figure 19:
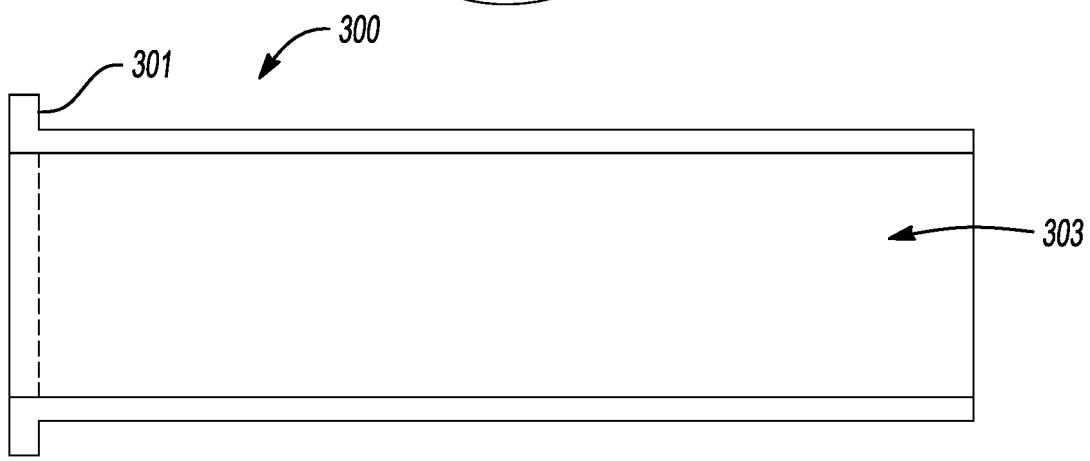
FIG. 19 depicts a side cross-sectional view of the sleeve/sleeve according to one or more embodiments shown and described herein.
Figure 20:
FIG. 20 depicts a photographic view of the sleeve/sleeve according to one or more embodiments shown and described herein.
Figure 21:
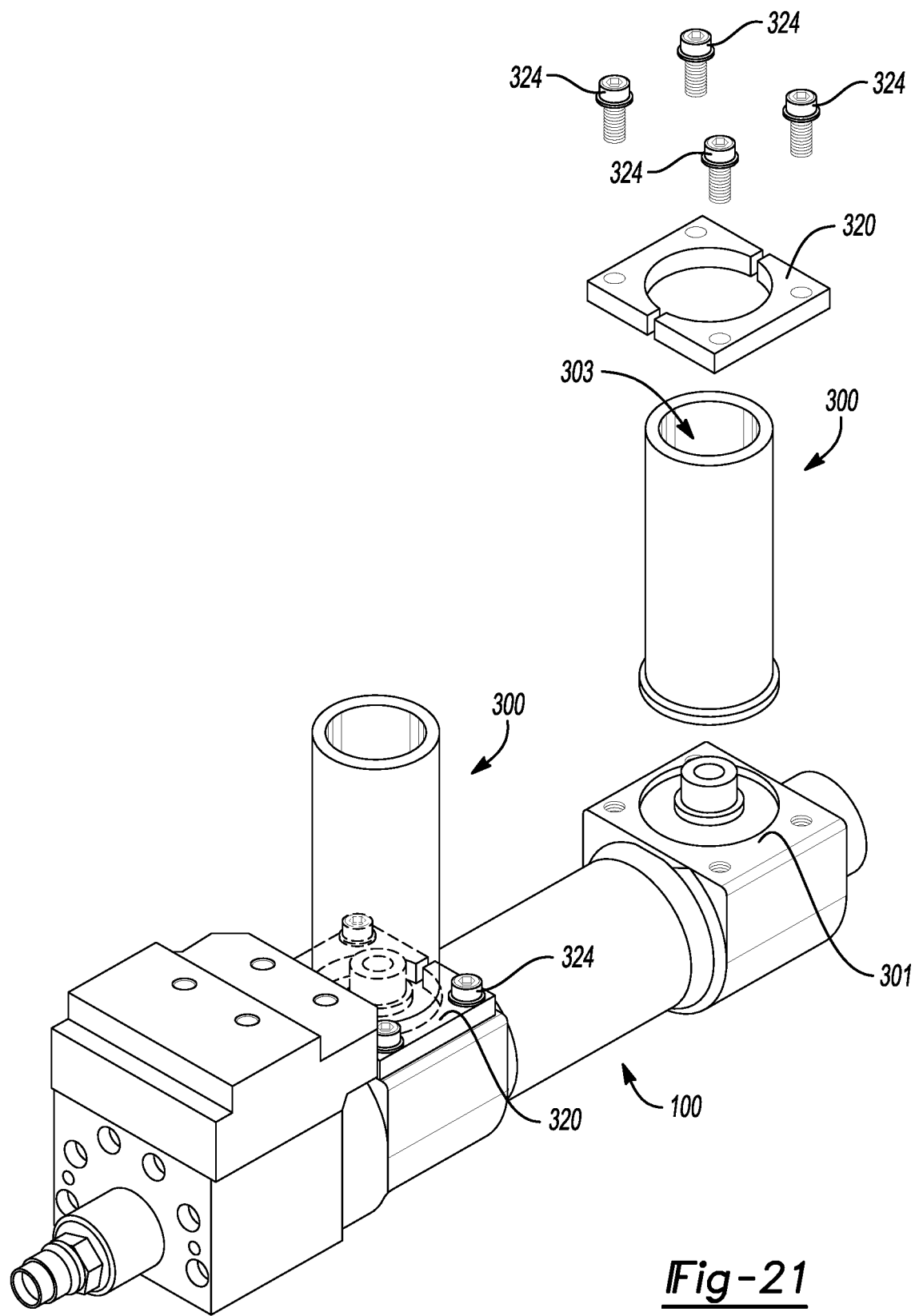
FIG. 21 depicts a partially exploded perspective view of the sleeve/sleeve connected to the hydraulic actuator by means of a 4-bolt flange according to one or more embodiments shown and described herein.

FIGS. 16 and 17 depict another a side schematic view of a threaded connection of a cylinder end cap 340 connecting to a hydraulic actuator 100 with threaded connections 330 using a bolt flange 320 and bolt apertures/bolts 324. The hydraulic actuator 100 includes a hydraulic 350. Oil 370 is depicted leaking from the leak points 360 and being trapped by the sleeve.

The sleeve 300 is configured to capture the oil 370 so that it does not drop on equipment, product, people, the floor . . . etc. for cleanliness and safety purposes. In some embodiments, the sleeve is clear, transparent, translucent, partially clear, partially translucent, or partially transparent so that the user can view the oil contained within sleeve 300 and to know when to drain or empty the sleeve 300. When it's time to empty the sleeve 300, the user removes the bolt connector 320 to remove the sleeve 300. The user then has the opportunity to identify the leak location, repair the leak on the actuator, and/or otherwise maintain the actuator. The sleeve 300 can then be cleaned and re-installed (or replaced).

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any Utility application) cover all such changes and modifications that are within the scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

ELEMENT LIST

| | |
|---|---|
| 100 | hydraulic actuator |
| 200 | bellows |
| 202 | actuator end |
| 204 | rod connector |
| 206 | hydraulic rod |
| 210 | magnet |
| 220 | oil |
| 300 | sleeve/hose |
| 301 | sleeve lip |
| 303 | sleeve interior |
| 320 | bolt flange |
| 322 | flange base |
| 324 | bolt apertures |
| 330 | threaded connections |
| 340 | cylinder end cap |
| 350 | hydraulic |
| 360 | oil leak point |
| 370 | oil |
| 380 | clamp |

I claim:

1. An oil leak mitigation system having a hydraulic actuator, the system comprising:
the hydraulic actuator having a threaded port on an end cap where oil can escape;
a sleeve having a lip, which extends perpendicularly from an exterior of the sleeve, and an interior capacity, the sleeve being a cylinder, the sleeve positioned covered completely around the threaded port on the end cap of the hydraulic actuator by means of a flange whereby the flange seals the sleeve, the sleeve lip configured to connect with a bolted flange having a flange base, wherein the sleeve lip is sandwiched between the bolted flange and the hydraulic actuator and a plurality of bolt apertures extend through the flange base to connect with the hydraulic actuator;
wherein as threaded port of the hydraulic actuator drips oil, the sleeve collects said oil to prevent leakage below.

2. The oil leak mitigation system of claim 1, wherein the sleeve is made of a material that is resistant to hydraulic fluid, to prevent degradation or damage to the sleeve.

3. The oil leak mitigation system of claim 1, wherein the sleeve is designed to be removable from the hydraulic actuator for maintenance and repair purposes.

4. The oil leak mitigation system of claim 1, further comprising a drainage outlet at the bottom of the sleeve to allow collected oil to be drained out of the system.

5. The oil leak mitigation system of claim 1, further comprising a seal or gasket positioned between the flange and the end cap of the hydraulic actuator to prevent oil from escaping around the connection.

* * * * *